G. H. CORLISS.
CUT-OFF AND WORKING VALVE FOR STEAM ENGINES.
761. REISSUED JULY 12, 1859.
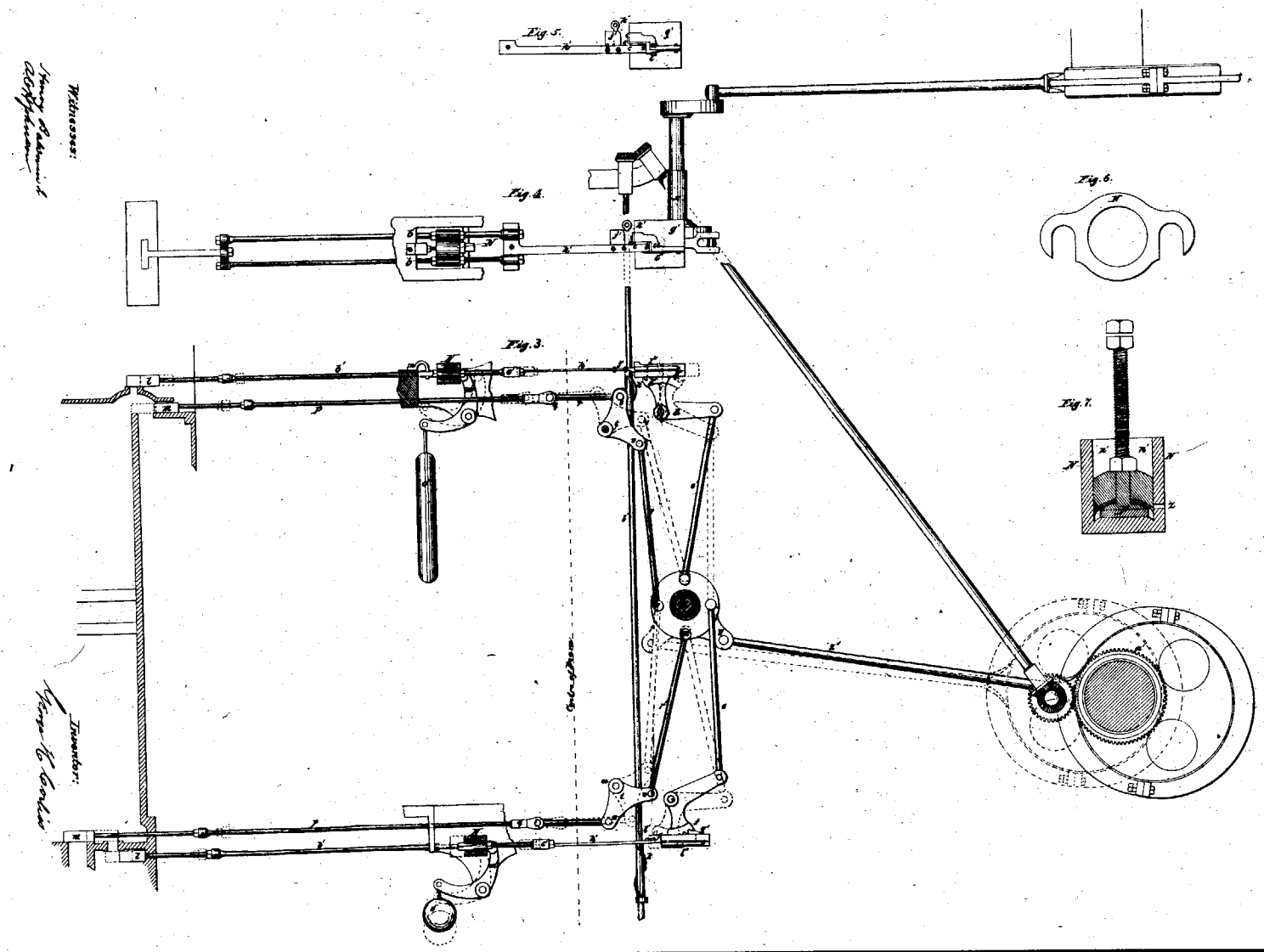

UNITED STATES PATENT OFFICE.

GEORGE H. CORLISS, OF PROVIDENCE, RHODE ISLAND.

CUT-OFF AND WORKING VALVE OF STEAM-ENGINES.

Specification forming part of Letters Patent No. 6,162, dated March 10, 1849; Reissued May 13, 1857, No. 761.

*To all whom it may concern:*

Be it known that I, GEORGE H. CORLISS, of the city and county of Providence and State of Rhode Island, have invented a new and useful Improvement in Valve Apparatus for Engines, and that the following is a full, clear, and exact description of my said invention, reference being had to the accompanying drawing, in which—

Figure 3, represents in elevation the valve mechanism of a beam engine to which my invention has been applied; Fig. 4 is a top view of certain portions of the same; and Fig. 5 a view of certain parts of the valve gear detached from the remainder.

The invention which is the subject of this patent is applicable to engines provided with a liberating valve gear, by which the valves are closed independently of the power of the engine. In engines having valve apparatus operating upon this principle, it is customary to draw the valves open by mechanism which receives motion from some moving part of the engine, and then to release the valve from this mechanism, so that it is independent of the control of the power of the engine, and caused to close by the operation of weights or springs. In such engines, it sometimes happens that the weights, or other means, used to close the steam valves do not accomplish this duty before the exhaust valve is opened, as the valve stem sometimes sticks in its stuffing box so tightly that the weight is not sufficient to overcome the friction; such an accident is followed by a great loss of steam as the steam entering the cylinder through the open steam valve flows through the open exhaust valve.

The object of my invention is to insure the closing of such valves by the power of the engine, whenever the independent means provided especially for that purpose do not perform their functions at the proper time; and it consists in combining with the part of the valve gear that appertains to the liberated steam valve, an instrument that has a positive progressive motion imparted to it by the power of the engine, in such manner that it follows the movement of the part of the valve gear appertaining to the liberated valve, and comes in contact therewith, and moves the valve to close its port, whenever this operation has not been anticipated by the liberation of the valve and the action of the weight or spring.

My present invention is represented in the accompanying drawing, as applied to the valve apparatus of an engine embodying other inventions for which patents bearing even date herewith have been granted to me; as however it may be applied to valve apparatus which does not embody these inventions, and as these may be used independently of it, I shall, in the present specification, describe only so much of the mechanism of the steam engine as I deem necessary to communicate a clear understanding of the invention herein claimed.

The mechanism represented in the accompanying drawings for operating the steam valves, ($l$ $l$,) is constructed in parts, one of which is connected permanently with each valve, while the other part is connected with the eccentric, so that it is constantly moved by the power of the engine while the engine is in operation. The part of the valve gear connected permanently with each valve consists of a double valve rod, ($b'$) upon which a weight ($o'$), is arranged to act through the intervention of a bent lever or bell crank ($m'$), to cause the valve to close its port whenever the part of the valve gear connected with each valve is separated from the remainder of the valve gear. The other part of the valve gear consists, in this instance, of the sliding blocks ($g'$, $g'$,); the bell crank ($d'$, $d'$), having teeth that engage with corresponding teeth in the blocks; the wrist plate ($x$) and its appurtenances; and the eccentric with its appurtenances, the latter in its revolution causing the sliding blocks to traverse to and fro. The part of the valve gear connected permanently with each valve is fitted with a variable link or medium of connection ($h'$), which is hinged to the valve rod ($b'$), and has an acting face ($c$), which can be placed in contact with a corresponding face ($e$) formed upon the adjacent sliding block. When these two faces are in contact the part of the valve gear connected permanently with the valve is moved along with the remainder, so that the valve is drawn open and the weight lifted by the power of the engine, the two faces ($c$), ($e$) remaining in contact until a separation is made by a lateral movement of the one to the other. Such a lateral movement is effected in the present example when steam is to be cut off by means of a cam $k$, which is turned by the power of the engine, through the intervention of a series of shafts and wheels the last of which is secured to the crank shaft, and as in this engine the shank of the link is not within the range of motion of the cam, a projection ($j'$), is secured to the link, upon which the cam bears when the separation of one part of the valve gear from the other, and the consequent liberation of the steam valve and the weight from the power and control of the engine, takes place, and the valve is then instantly closed by the power of the weight.

In order that each steam valve may uncover its port at the proper moment to admit steam to the cylinder, the adjacent member of the part of the valve gear appertaining to the eccentric, which in this instance is the sliding block ($g'$) is moved back by the turning of the eccentric by the power of the engine into such a position that the link ($h'$) can be moved laterally to place its acting face ($c$) within the range of motion of the face ($e$) upon the sliding block ($g'$,) when the latter is again moved to draw the valve along. These movements of the valve gear take place before the piston is ready to make its stroke from the adjacent end of the cylinder—the lateral movement of the link being effected by the spring $i''$.

When the liberation of the valve from the opening mechanism has been effected, the weight tends to return the valve over its port to close it; but if, from the sticking of the valve rod in its stuffing box or elsewhere, or from the failure of the weight to act promptly, or from any other cause the immediate closing of the valve does not take place; provision should be made for closing it with certainty by the positive movements of the engine. In order then to effect this purpose a projection ($u$) is formed upon the sliding block opposite to the end of the variable link ($h'$,) in such a position with reference to the latter that as the sliding block is moved back to follow the liberated valve by the operation of the eccentric prior to the next succeeding opening of the adjacent exhaust valve; this projection ($u$) moves in the path of the end of the variable link. Hence if the weight does not close the valve this projection coming in contact with the end of the link, during the return motion of the sliding block, will push the valve back and cause it to close its port. The projection ($u$) thus constitutes an instrument, which, being moved regularly by the power of the engine through the intervention, in this case, of the eccentric and the other portions of the valve gear, insures the closing of the liberated valve whenever the weight, which in this instance is the means provided for that purpose, does not act. It is not however necessary that the instrument should be secured to the valve gear, as it may evidently have motion imparted to it by some other moving part of the engine; nor is it necessary that it should be arranged to act upon the end of the link, that connects the part of the valve gear permanently attached to the valve with the remainder of the valve gear, as it may be arranged to act upon some other portion of the part of the valve gear that appertains to the valve, or directly upon the valve itself; but the location and arrangement described are the most convenient for the particular valve apparatus represented in the drawings.

What I claim as my invention and desire to secure by Letters Patent is:—

The combination with the part of the valve gear that appertains to a liberated steam valve, of an instrument moved by the power of the engine, in such manner as to effect the closing of the liberated valve, whenever the independent means provided for that purpose fail to act in time.

In testimony whereof I have hereunto subscribed my name.

GEORGE H. CORLISS.

Witnesses:
HENRY BALDWIN, JR.,
JOHN S. HOLLINGSHEAD.

[FIRST PRINTED 1911.]